April 18, 1950  R. J. DETUNO ET AL  2,504,815
AUTOMATIC CONVEYERIZED BRAZING APPARATUS
Filed Nov. 16, 1945  3 Sheets-Sheet 1

INVENTORS
R. J. DETUNO
H. W. GARBE
BY E. F. Kane
ATTORNEY

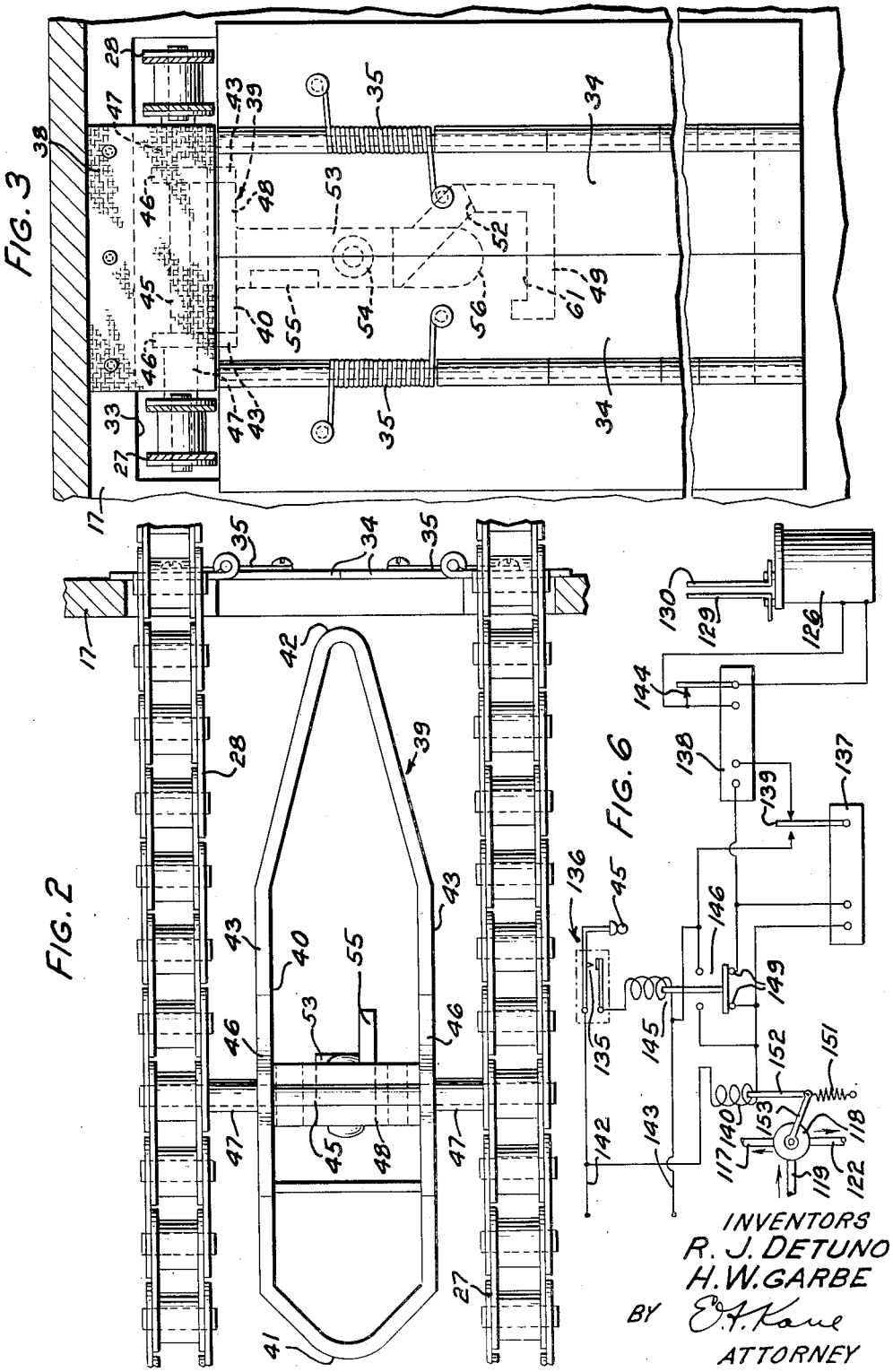

April 18, 1950 R. J. DETUNO ET AL 2,504,815
AUTOMATIC CONVEYERIZED BRAZING APPARATUS
Filed Nov. 16, 1945 3 Sheets-Sheet 3

INVENTORS
R. J. DETUNO
H. W. GARBE
BY E. F. Kane
ATTORNEY

Patented Apr. 18, 1950

2,504,815

UNITED STATES PATENT OFFICE 2,504,815

AUTOMATIC CONVEYERIZED BRAZING APPARATUS

Rocco J. Detuno, Chicago, Ill., and Howard W. Garbe, Eau Claire, Wis., assignors to Western Electric Company, Incorporated, New York, N. Y., a corporation of New York Application November 16, 1945, Serial No. 629,166

2 Claims. (Cl. 263—8)

This invention relates to automatic conveyorized brazing apparatus and more particularly to automatic apparatus for conveying and treating successive articles prior to, during and subsequent to brazing.

An object of this invention is the provision of a simple and efficient apparatus for brazing articles.

Another object of this invention is the provision of a simple and practicable automatic apparatus for efficiently conveying and uniformly brazing and treating successive articles prior to, during brazing, and while cooling in a non-oxidizing atmosphere.

In accordance with the general features of this invention, there is provided, in one embodiment thereof as applied to the brazing of copper tubes to copper bodies of magnetron tubes, an apparatus comprising an intermittently actuated endless conveyor having carriers pivoted thereon at spaced intervals for supporting depending fixtures, to which the assemblages of tube parts are clamped. The assemblages are carried sequentially through a flushing compartment, a brazing chamber, a cooling chamber and finally to an unloading and loading position open to atmosphere. In the brazing chamber, the conveyor is arranged to carry the assemblage out of a straight path to move it into an intermittently energized high frequency coil having a configuration such that it will heat directly only a restricted area of the assemblage. A non-oxidizing atmosphere is individually supplied to the flushing compartment and the cooling chamber and a reducing atmosphere to the brazing chamber to protect the articles during operations on them. Spring returned entrance and exit doors are arranged between the several compartments, chambers and the unloading and loading position to maintain the various gases in their respective chambers and compartments, the doors being opened by the engagement therewith of an extended portion on each of the carriers as they pass into and out of the compartments and chambers.

Other objects and advantages of this invention will be apparent from the following detailed description taken in conjunction with the accompanying drawings, in which Fig. 1 is a fragmentary vertical longitudinal section, partly in elevation, of an apparatus embodying the features of the invention;

Fig. 2 is an enlarged fragmentary plan view, partly in section, taken on the line 2—2 of Fig. 1;

Fig. 3 is an enlarged fragmentary vertical view, partly in section, taken on the line 3—3 of Fig. 1;

Fig. 4 is an enlarged fragmentary detail side view of the conveyor and a pivotal carrier thereon supporting a fixture to which is clamped a tube assemblage, the parts being shown as they appear while in the brazing chamber with the assemblage lowered into the induction heating coil, which is shown fragmentarily;

Fig. 5 is an end view of the parts shown in Fig. 4, looking toward the right end thereof, the conveyor being shown partly in section; and Fig. 6 is a diagrammatic view illustrating an electric circuit for controlling the operation of the apparatus.

Figure 1:
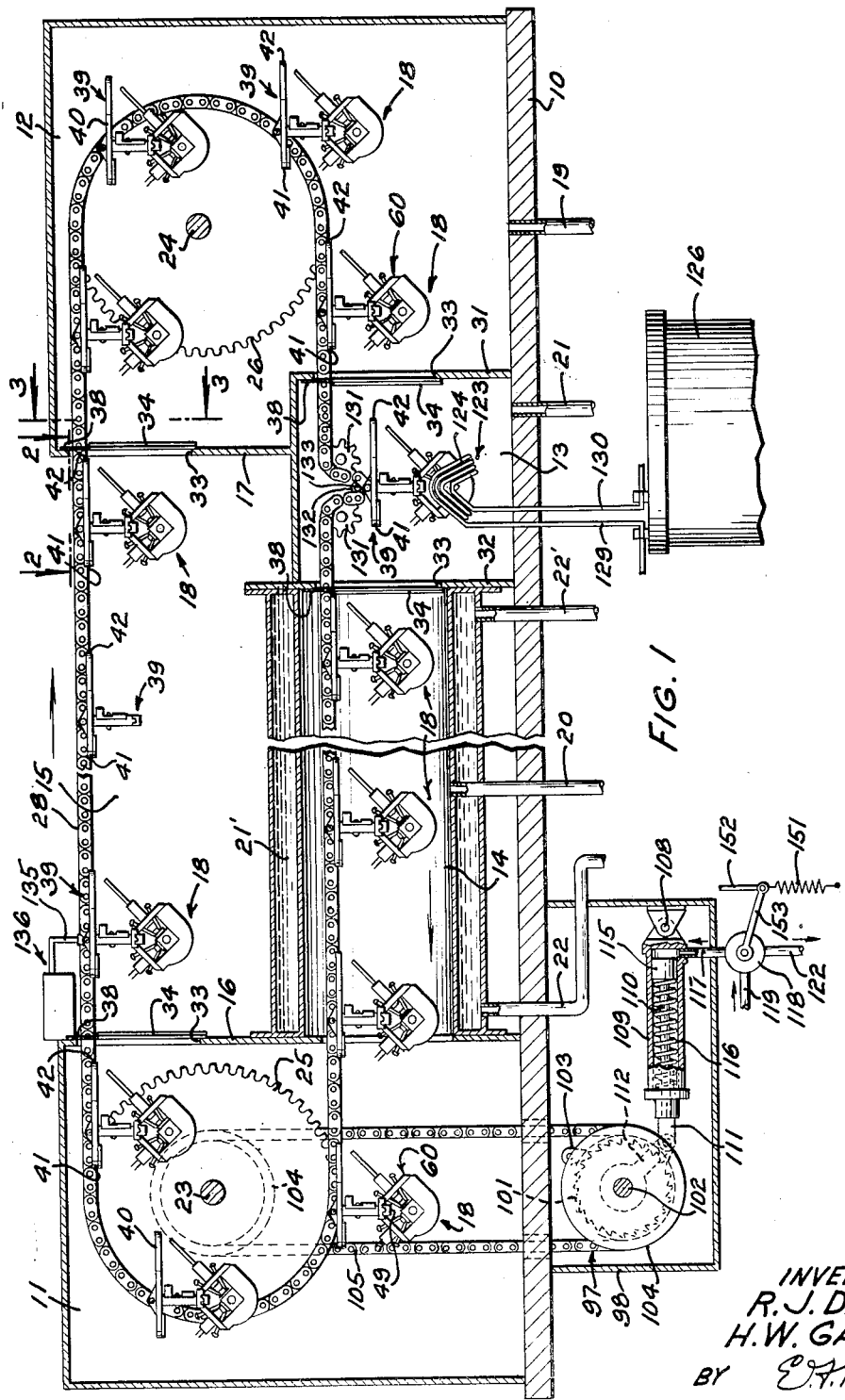

Referring to the drawings in detail and particularly to Fig. 1, a base or bench top 10 is provided, upon which are mounted spaced compartments 11 and 12, which are interconnected at their lower portions by compartments or chambers 13 and 14, the chamber 14 being open to communication with compartment 11. A space 15 above the chambers 13 and 14 and extending between inner vertical opposed walls 16 and 17 of the spaced compartments 11 and 12, respectively, provides an unloading and loading position, at which an attendant removes brazed and treated tube assemblages, indicated in general by the numeral 18, from the apparatus and mounts other assemblages to be brazed and treated thereon. In the compartment 12, the assemblages are flushed with an inert or non-oxidizing atmosphere introduced therein through an inlet pipe 19, preparatory to their entering the chamber 13, in which the brazing is effected, and the cooling chamber 14 is also supplied through an inlet pipe 20 with an inert or non-oxidizing atmosphere. A reducing atmosphere is supplied to the brazing chamber 13 through an inlet pipe 21, the inlet pipes being supplied from suitable sources (not shown). The pressure of the reducing atmosphere supplied to the brazing chamber 13 is slightly greater than the pressure of the non-oxidizing atmosphere supplied to the flushing compartment and cooling chambers 12 and 14, respectively, in order to exclude the latter atmosphere from the brazing chamber as much as is practically possible. Also, the pressure of the non-oxidizing atmosphere supplied to the compartment 12 and chamber 14 is slightly greater than atmospheric pressure to prevent the entrance of air into them. The chamber 14, which freely communicates with the compartment 11, also serves as a cooling chamber for the assemblages 18 as they emerge from the brazing chamber. Surrounding the chamber is a jacket 8, through which a cooling fluid is circulated by inlet and outlet pipes 22 and 9, respectively, which are supplied from a suitable source (not shown).

Suitably journalled in opposite side walls of the compartments 11 and 12 are horizontal shafts 23 and 24, respectively, to each of which is fixed, in similarly spaced and aligned relation, a pair of sprocket wheels 25 and 26, respectively. Extending around each set of sprocket wheels 25 and 26 are aligned sprocket chains 27 and 28, respectively, the upper lengths of the chains being intermittently advanced in unison in the direction of the arrow (Fig. 1) by means to be referred to hereinafter. The compartment walls 16 and 17 and walls 31 and 32 between the compartment 12 and chamber 13 and between the latter chamber and the chamber 14, respectively, are provided with suitably shaped openings 33 (Fig. 3) to permit the free passage of the chains 27 and 28 therethrough and the lower portions of each opening below the length of chain which passes through the openings is equipped with a pair of vertically hinged doors 34. Each door is normally maintained in a closed position by a coiled torsion spring 35. To further normally maintain the openings 33 closed, a flap 38 of canvas is secured along its upper portion to each of the referred-to walls with its free lower edge just clearing the upper edges of the pairs of doors 34, the flap at its opposite vertical edges as viewed in Fig. 3, just clearing the inner opposed vertical faces of the chains 27 and 28. The purpose of the doors 34 and flaps 38 is to maintain the flushing compartment 12 and brazing chamber 13 closed to each other as much as is practically possible and, similarly, the chambers 13 and 14, as well as the chambers 11 and 12, closed to atmosphere at opposite ends of the unloading and loading position 17.

As shown in Figs. 2, 4 and 5, the chains 27 and 28 have carriers pivotally attached thereto along their lengths at equally spaced points, indicated in general at 39, each carrier comprising an elongated open frame 40 having its opposite ends tapered and rounded, as indicated at 41 and 42, for a purpose to be referred to hereinafter, and having longitudinal side bars 43. The carriers 39 are pivoted to the chains 27 and 28 and disposed between the inner opposed faces of the chains at each point of attachment by a pin 45, which extends freely through vertical apertured lugs or eyes 46 on the side bars 43 of the frame 40. Each pin 45 is connected at its ends to the chains, replacing the usual link-connecting pins of the chains at the points of attachment thereto. Spacer sleeves 47 freely surrounding the pin 45 between the faces of the side bars 42 and the adjacent sides of the chains 27 and 28 serve to maintain the carrier 39 centered therebetween. Formed integrally with the carrier frame 40 is a cross bar 48 (Figs. 2 and 4), which is aligned with and below the pin 45. Integral with and depending from the cross bar 48 is a hook portion 49 having a recess 52 in its right side, as viewed in Fig. 4, in which is fitted a clamping lever 53 pivoted at 54 to the hook portion 49. The lever 53 has a handle 55 at its upper end and a rounded lower end face 56, which, when the lever is in its operative position, as shown in the drawings, lies over and slightly spaced from a horizontal surface 59 of a fixture, indicated in general at 60 (Fig. 4), to which is clamped the tube assemblage 18, the fixture being suspended from a horizontal surface 61 of the hook portion 49, as shown in Figs. 4 and 5, and being prevented from being dislodged therefrom by the lever 53.

The magnetron tube assemblage 18 to be treated and brazed comprises, referring to Figs. 4 and 5, a rectangular shaped copper shell 65 having a pair of spaced irregular shaped flanges or fins 66 projecting from two angularly arranged faces 67 and 68 of the shell and extending beyond the planes of two other angularly arranged faces 69 and 70 of the shell. Formed in the ends of the fins 66, which extend beyond the face 69 of the shell 65, are two pairs of aligned apertures 73 and also formed in the ends of the fins which extend beyond the shell face 70 is a single pair of aligned apertures 74, the apertures 73 and 74 being used for attaching to the tube an element (not shown), which cooperates with the tube when in use. In the present apparatus, copper sleeves 75 and 76 are to be brazed to the faces 69 and 70 of the shell 65. The sleeves 75 and 76 have sealed glass envelopes or tubes 77 and 78, respectively sealed to their outer ends and have circular flanges 81 and 82, respectively, at their inner ends, which, in the operation of the apparatus, are brazed to the shell faces 69 and 70, respectively. Ring-shaped pieces of silver solder 83 aand 84 are placed on the assemblage 18 surrounding the junctures of the shell faces 69 and 70 and the outer peripheries of the sleeve flanges 81 and 82, respectively, the solder being fused during the brazing operation to unite the parts of the assemblage.

The fixture 60, to which the assemblage 18 is clamped, and which is suspended from the hook portion 49 of the carrier 39, comprises two irregular shaped members 87 and 88 apertured to freely receive the glass tubes 77 and 78. Formed on the members 87 and 88 at their lower ends, as viewed in Fig. 4, are apertured lugs 89 and 90, respectively, which are entered between the spaced fins 66 of the tube shell 65, the apertures in the lugs being aligned with the apertures 73 and 74 in the fins, and holding pins 91 are threaded thereinto. With the members 87 and 88 thus connected to the fins 66, the inner faces of the members 87 and 88, from which the lugs 89 and 90, respectively, project, lie parallel to and substantially abut the upper end edges of the fins (Fig. 4). Pivotally interconnected, as indicated at 94, to the upper ends of the members 87 and 88, as viewed in Fig. 4, is a link 95 forked at opposite ends to receive the ends of the members 87 and 88, the bottom horizontal surface of the link resting on the horizontal surface 61 of the hook portion 49 of the carrier 39. Each of the members 87 and 88 is equipped with a pair of clamping screws 96, the screws of each pair being arranged at diametrically opposite points of the sleeves 75 and 76 and extend through suitably arranged threaded apertures in the members so that the inner ends of the screws will engage outer annular faces of the flanges 81 and 82 of the sleeves. Upon the screws 96 being threaded inwardly, the flanges 81 and 82 may be firmly clamped to the shell faces 69 and 70 and thus firmly held during the brazing operation. It will be understood that the tube assemblage 18 and fixture 60 are assembled in the manner above described previous to the suspension of the fixture on the carrier 39.

To intermittently actuate the sprocket chains 27 and 28 which support the carriers 39, a pawl and ratchet mechanism 97 is arranged below the bench top 10 (Fig. 1) and is supported on a framework 98. This mechanism 97 comprises a ratchet wheel 101 fixed to a rotatable shaft 102 carried on the framework 98, a retaining pawl being indicated at 103. Secured to the shafts 23 and 102 are sprocket wheels 104—104 and interconnecting the wheels is a sprocket chain 105. Pivoted to the framework 98, as indicated at 108, is an air cylinder 109 having a piston rod 110, to the outer end of which is attached a pawl 111, which operatively engages the ratchet wheel 101. Pivotally attached to the pawl 111 is an arm 112, which is pivoted on the shaft 102, the arm serving to support and maintain the pawl in engagement with the ratchet wheel 101 at all times during the movement of the cylinder 109 about its pivot 108 during the advance and retraction of the piston rod 110. Surrounding the piston rod 110 and bearing at opposite ends against a piston 115 and a wall of the cylinder 109 is a coiled spring 116, which is compressed when the piston is advanced toward the left, as viewed in Fig. 1, to actuate the ratchet wheel 101. The piston may be moved to the left (Fig. 1) by air under pressure admitted through an inlet pipe 117 into the cylinder upon actuation of a solenoid actuated valve 118, which is connected to a suitable source of air under pressure by a pipe 119. When the valve 118 is actuated to cut the air pressure off from the cylinder 109 and the cylinder is opened to atmosphere through the valve and an outlet pipe 122, the compressed spring 116 acts to return the piston 115 and the attached pawl 111 to its normal position as shown.

Within the brazing chamber 13, there is suitably supported a stationary high frequency heating coil 123, having the configuration shown in Figs. 1, 4 and 5 and comprising multiple turns of copper tubing through which water is circulated for cooling purposes. Inverted V-shaped interconnected side arms 124 and 125 of the coil 123, shaped to provide a maximum of heating at the desired points on the tube assemblages 18, in a predetermined period of time, are so spaced apart that the assemblages may freely enter therebetween as they are intermittently advanced by the conveyor chains 27 and 28 and moved downwardly in succession into and maintained in the coil for a predetermined period of time for heating the same sufficiently to cause the ring shaped pieces of solder 83 and 84 to fuse and thus braze the tube parts together. The coil 123 is periodically connected, in a manner to be presently described, to a source of high frequency current 126 (Fig. 1) by means of a pair of leads 129 and 130.

In order to lower each tube assemblage 18 into position in the coil 23, as shown in Figs. 1, 4 and 5, after it enters the brazing chamber 13, the conveyor chains 27 and 28 are guided over laterally spaced sets of suitably supported sprocket wheels 131 (Fig. 1) and under rollers 132 arranged intermediate and below the sets of sprocket wheels, the rollers being carried on a shaft 133 suitably arranged relative to the coil and supported at each end in opposite walls of the chamber 13.

Referring to Fig. 6, which illustrates diagrammatically certain portions of the apparatus and a circuit for controlling the intermittent actuation of the chain conveyor and the operation of the circuit to the brazing coil 123 in timed relation therewith, it will be seen that one of the pins 45, which pivotally supports the carriers 39 on the conveyor chains 27 and 28, has, in the last intermittent advance of the chain conveyor, cammed open a normally biased to close contact 135 of a switch 136 arranged along the upper length of the chain conveyor (Fig. 1) and that a tube assemblage 18 positioned in the brazing coil 123 (Figs. 1, 4 and 5) is being heated. A pair of timing devices 137 and 138 serve to control the sequence of operation of the apparatus. The timing device 137, in the preferred embodiment of the invention, may be any suitable device which, upon being operated, will move a contact 139 to the position shown in Fig. 6 and will hold that contact closed for two minutes and will then move it to its opposite position. When the timing device 137 moves the contact 139 to the position shown, it will initiate operation of a timing device 138, which, upon being started in operation, will, after a two-second delay, close a contact pair 144 to render the high frequency source 126 effective. After the contact pair 144 is closed, it will remain closed under control of the timing device 138 until the contact 139 of timer 137 is moved to the position opposite to that shown upon the completion of the two-minute cycle of the timing device 137. The two-second delay by the timing device 138 will permit an assemblage 18, which has been stepped into the high frequency coil 123, to come to rest before the current is supplied to the coil 123 from the source 126. When contact 139 moves to the position opposite that shown, it will momentarily energize a solenoid 140 in a circuit from a conductor 142 of a suitable power source, through the solenoid 140, contact 139 and back to a conductor 143 of the power source. When contact 139 of the timing device 137 is thus reversed, as hereinbefore described, the contact 144 of the timing device 138 will be opened.

The above-described momentary energization of the solenoid 140 will operate the air valve 118 and supply air pressure to the cylinder 109 to start the movement of the piston rod 110 to the left (Fig. 1) and thus the pawl and ratchet mechanism 97 is actuated to advance the chain conveyor forward one step, thereby advancing the switch actuator pin 45, which last cammed open the contact 135 of the switch 136, and disengaging the same from the switch 136 and permitting the contact 135 to close for energizing a solenoid type relay 145, which will stay energized over a circuit from the conductor 142 until the contact 135 is again cammed open by the next succeeding actuator pin 45 on the chain conveyor. When the relay 145 is thus energized, it will break the circuit through the timers 137 and 138 at contacts 149, thus restoring the timing devices to their inoperative conditions. At the same time, a holding circuit to the solenoid 140 will be maintained over a path from the conductor 142 through the solenoid 140 and upper relay contacts 146 to conductor 143 until an actuator pin 45 opens the contact 135 of the switch 136, whereupon the relay 145 will be deenergized and its upper contacts 146 will be opened and its lower contacts 149 will be closed. The opening of the upper relay contacts 146 opens the holding circuit for the solenoid 140, whereupon a spring 151 attached to a movable core 152 of the solenoid pulls the core downwardly to its normal inoperative position, as shown in Fig. 6, and by means of a valve actuating lever 153, pivotally connected to the core, the valve 118 is actuated to cut the air pressure off from the cylinder 109 and the pawl 111 and connected parts are returned to their normal positions (Fig. 1) in the manner previously described. The closing of the lower relay contacts 149 will reinitiate a cycle of the timers 137 and 138 to connect the source of high frequency current 126 to the brazing coil 123, in the manner previously described, after a period of two seconds and the cycle above described is then repeated in succession every two minutes.

What is claimed is:

1. An apparatus for conveying an article into the cavity of a heating means having upwardly extending sides to form a channel-shaped cavity for receiving an article to be heated, comprising a horizontally movable flexible conveyor, a carrier freely suspended therefrom for carrying an article supporting fixture, said carrier having a hook portion at its lower end provided with a horizontally disposed flat face from which the fixture is suspended, movable means on said carrier for movement into operative position relative to the fixture to prevent dislodgment of the fixture from said carrier, and guide means for causing a portion of said conveyor to form a downwardly extending loop in its advance for lowering said carrier to move an article into the cavity of the heating means.

2. An apparatus for conveying an article into the cavity of a heating means having upwardly extending sides to form a channel-shaped cavity for receiving an article to be heated, comprising a horizontally movable flexible conveyor, a carrier freely suspended therefrom for carrying an article supporting fixture, said carrier having a hook portion at its lower end provided with a horizontally disposed flat face from which the fixture is suspended, a pivotal lever on said carrier having an arc-shaped end face for movement into operative position relative to said horizontally disposed flat face of the fixture to prevent dislodgment of the fixture from said carrier, and guide means for causing a portion of said conveyor to form a downwardly extending loop in its advance for lowering said carrier to move an article into the cavity of the heating means.

ROCCO J. DETUNO.
HOWARD W. GARBE.

REFERENCES CITED

The following references are of record in the file of this patent:

UNITED STATES PATENTS

| Number | Name | Date |
|---|---|---|
| Re. 22,322 | Goodridge | May 25, 1943 |
| 793,268 | Bates et al. | June 27, 1905 |
| 890,251 | Thompson | June 9, 1908 |
| 1,085,197 | Fairbanks | Jan. 27, 1914 |
| 1,238,011 | Ellis | Aug. 21, 1917 |
| 1,646,498 | Seede | Oct. 25, 1927 |
| 1,667,738 | Nichols | May 1, 1928 |
| 1,808,241 | Martin | June 2, 1931 |
| 1,817,810 | Emerson | Aug. 4, 1931 |
| 1,951,400 | Dvorak | Mar. 20, 1934 |
| 2,040,884 | Somes | May 19, 1936 |
| 2,052,010 | Bailey | Aug. 25, 1936 |
| 2,118,480 | Somes | May 24, 1938 |
| 2,177,299 | Fredrickson | Oct. 24, 1939 |
| 2,328,225 | Morey | Aug. 31, 1943 |
| 2,349,578 | Ellen | May 23, 1944 |